Nov. 24, 1936.    J. H. HAMMOND, JR    2,062,003
NAVIGATIONAL GUIDE SYSTEM
Original Filed Nov. 2, 1929    9 Sheets-Sheet 1
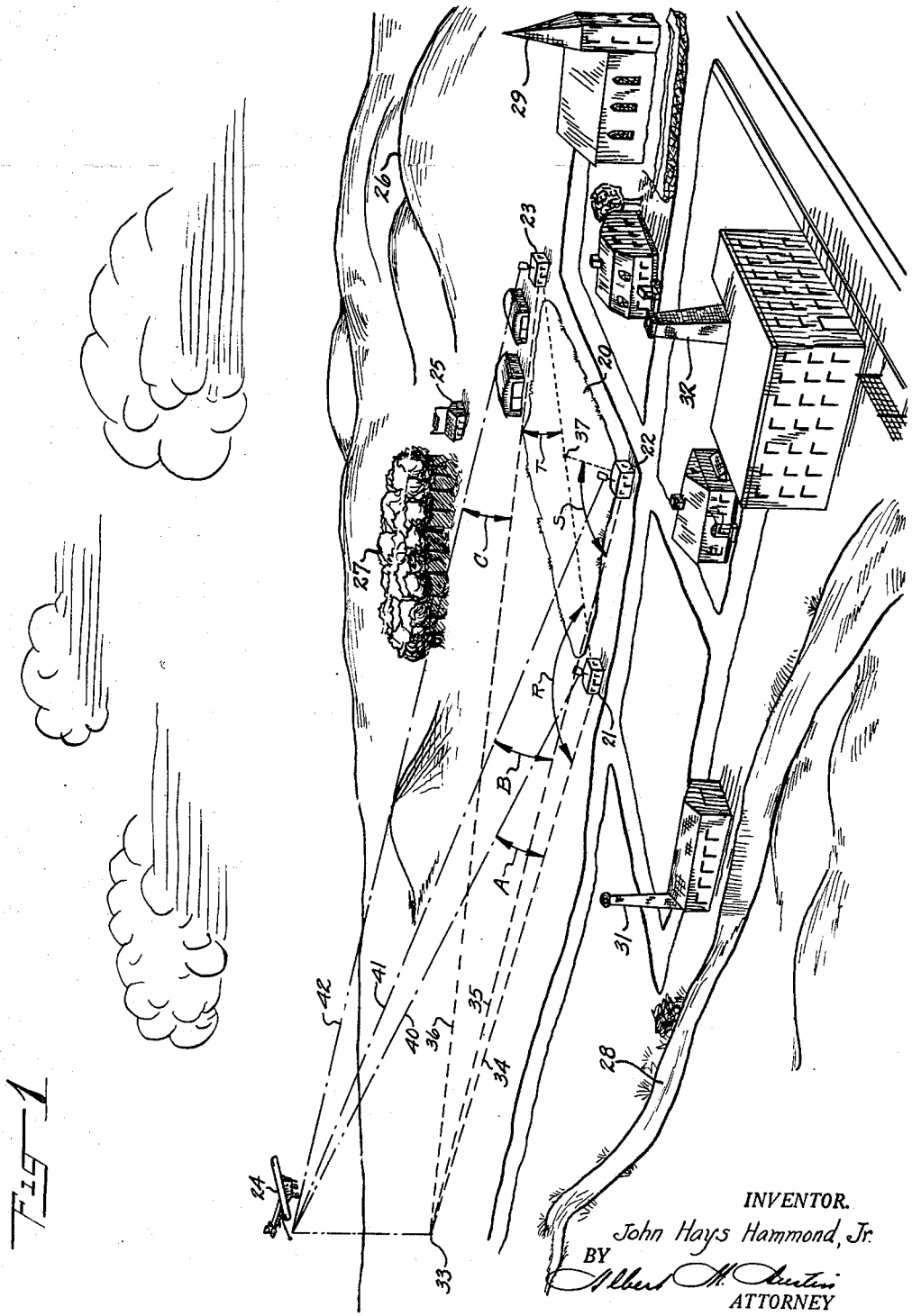
INVENTOR.
John Hays Hammond, Jr.
BY
ATTORNEY

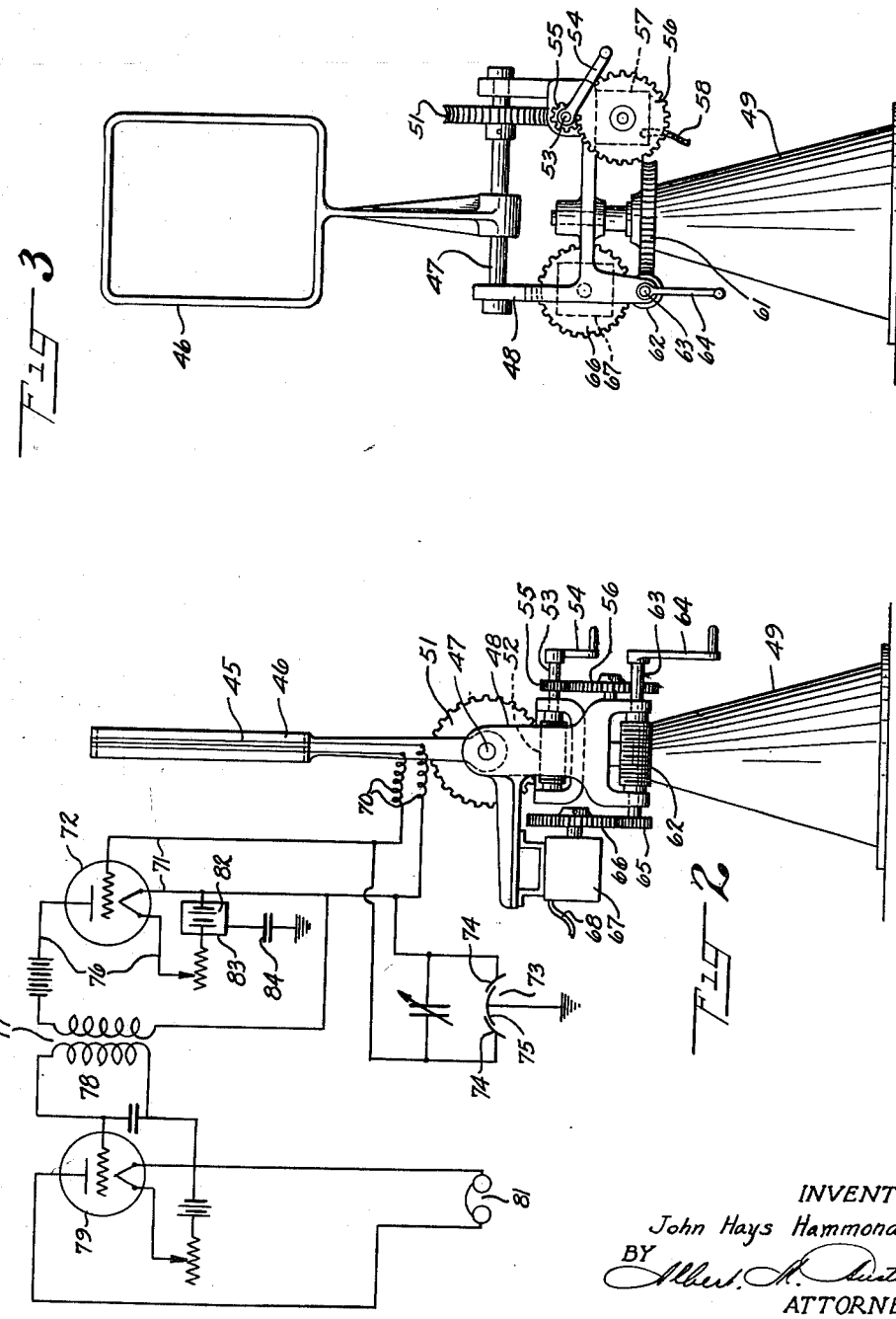

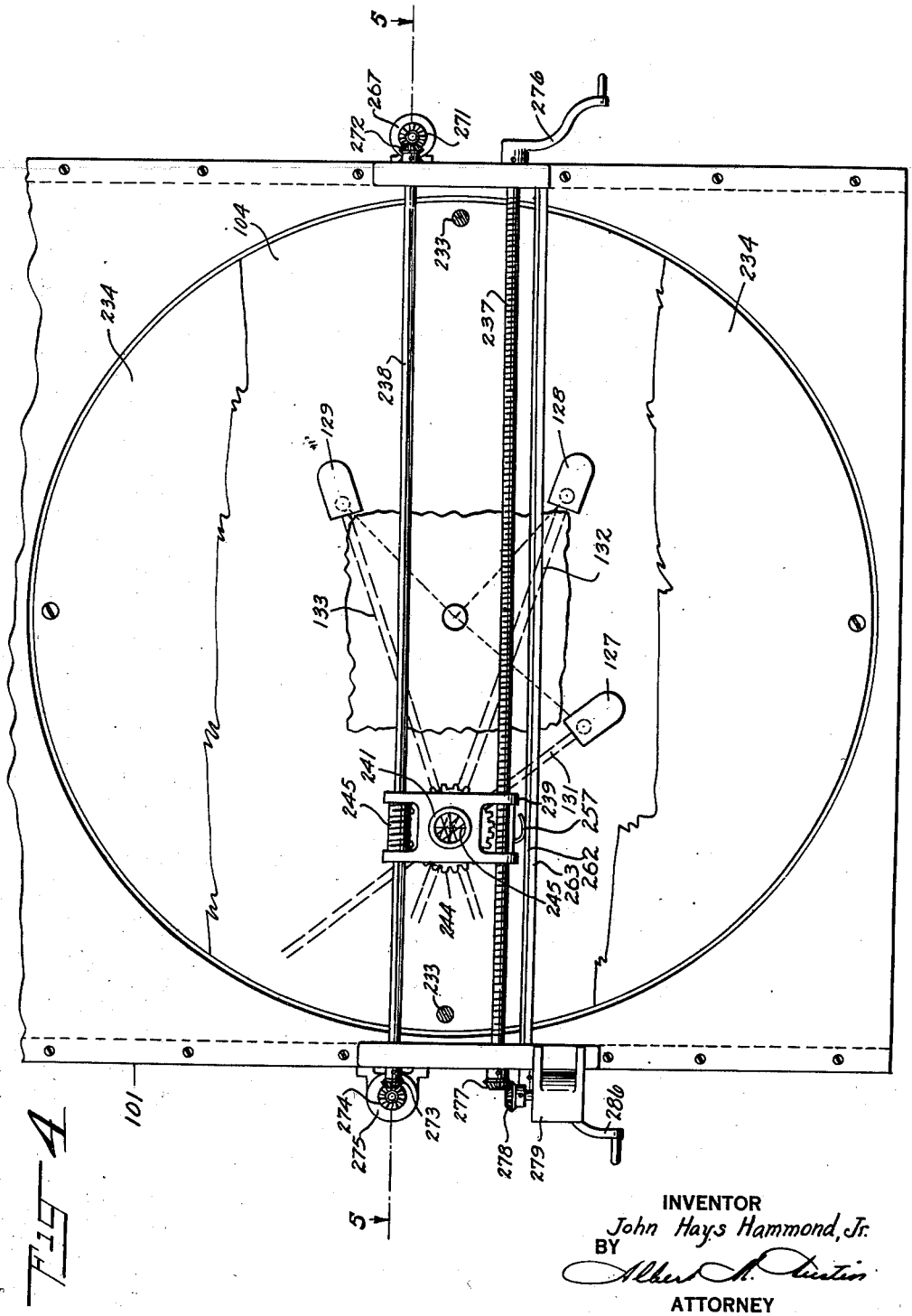

Nov. 24, 1936.   J. H. HAMMOND, JR   2,062,003
NAVIGATIONAL GUIDE SYSTEM
Original Filed Nov. 2, 1929   9 Sheets-Sheet 4
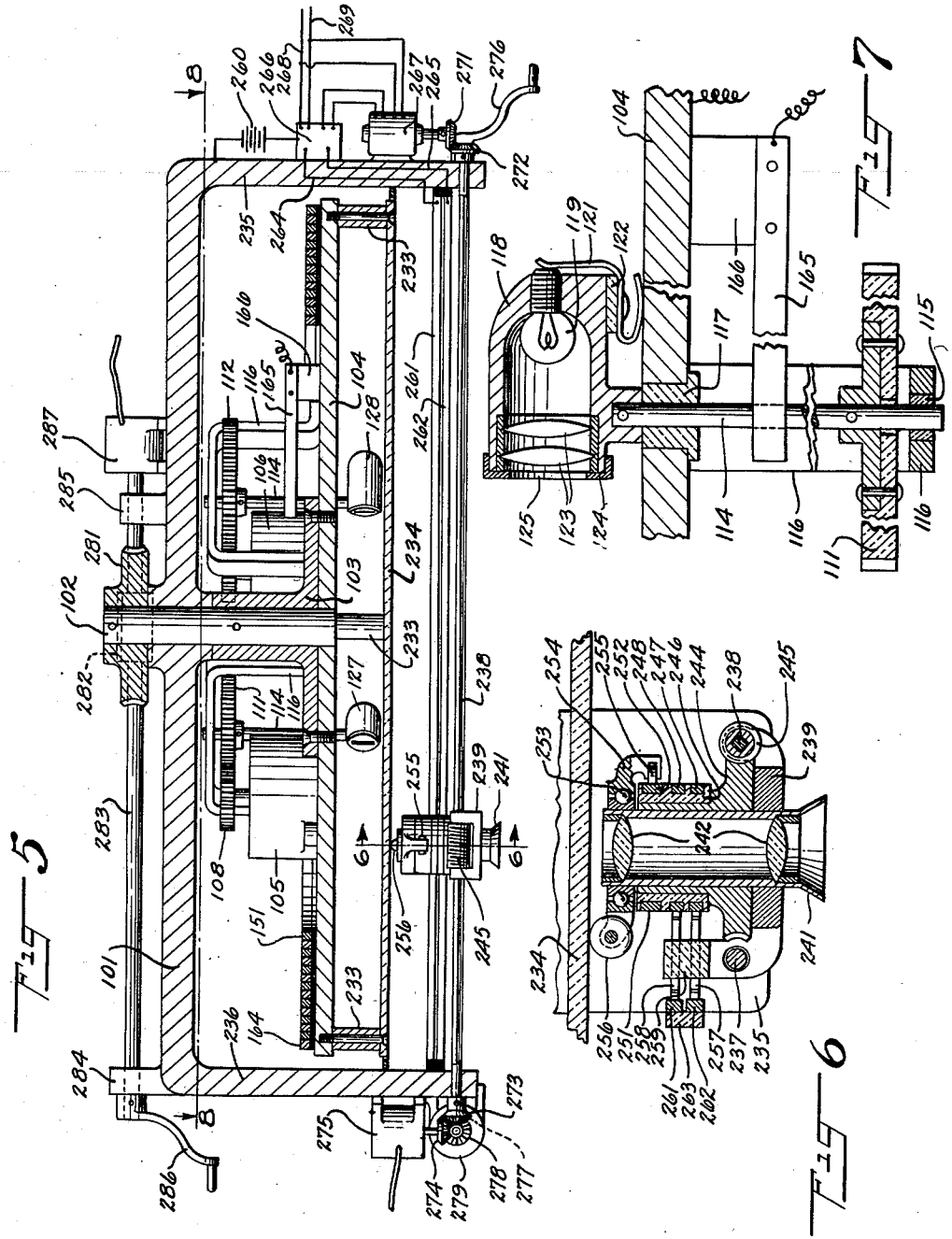
INVENTOR
John Hays Hammond, Jr
BY
ATTORNEY Nov. 24, 1936.   J. H. HAMMOND, JR   2,062,003
NAVIGATIONAL GUIDE SYSTEM
Original Filed Nov. 2, 1929    9 Sheets—Sheet 5

INVENTOR
John Hays Hammond, Jr.
BY
ATTORNEY

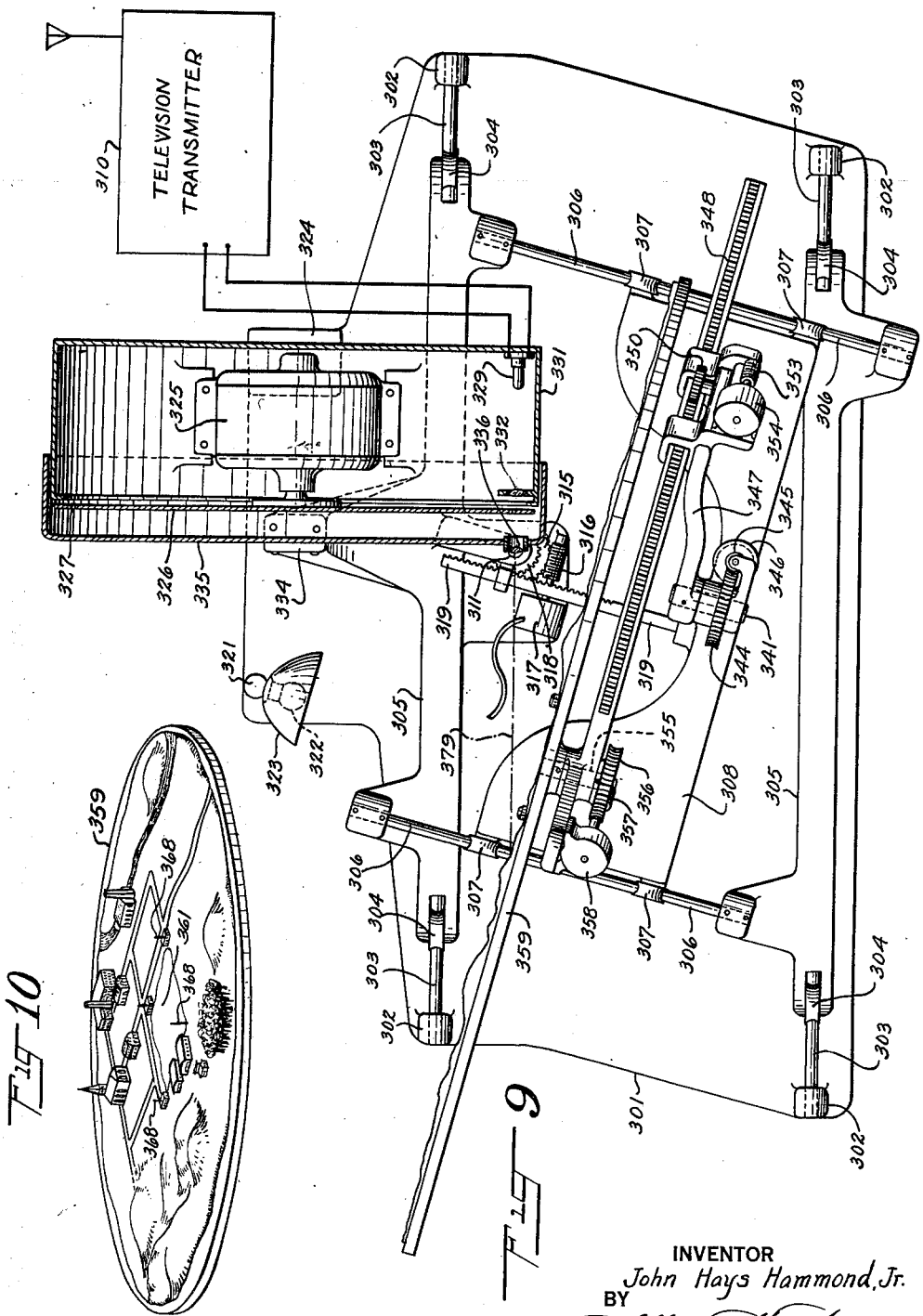

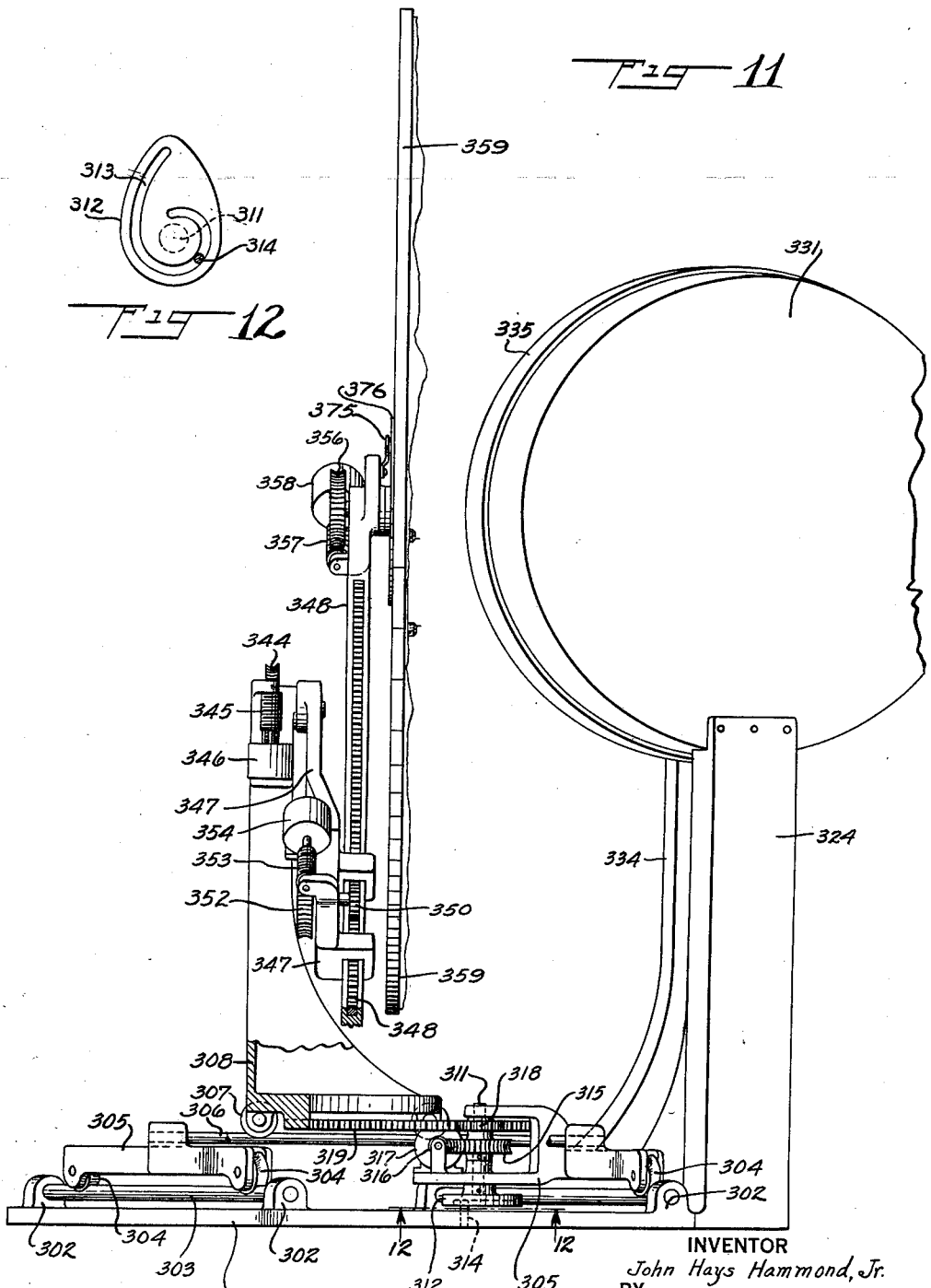

Nov. 24, 1936.  J. H. HAMMOND, JR  2,062,003
NAVIGATIONAL GUIDE SYSTEM
Original Filed Nov. 2, 1929  9 Sheets-Sheet 8
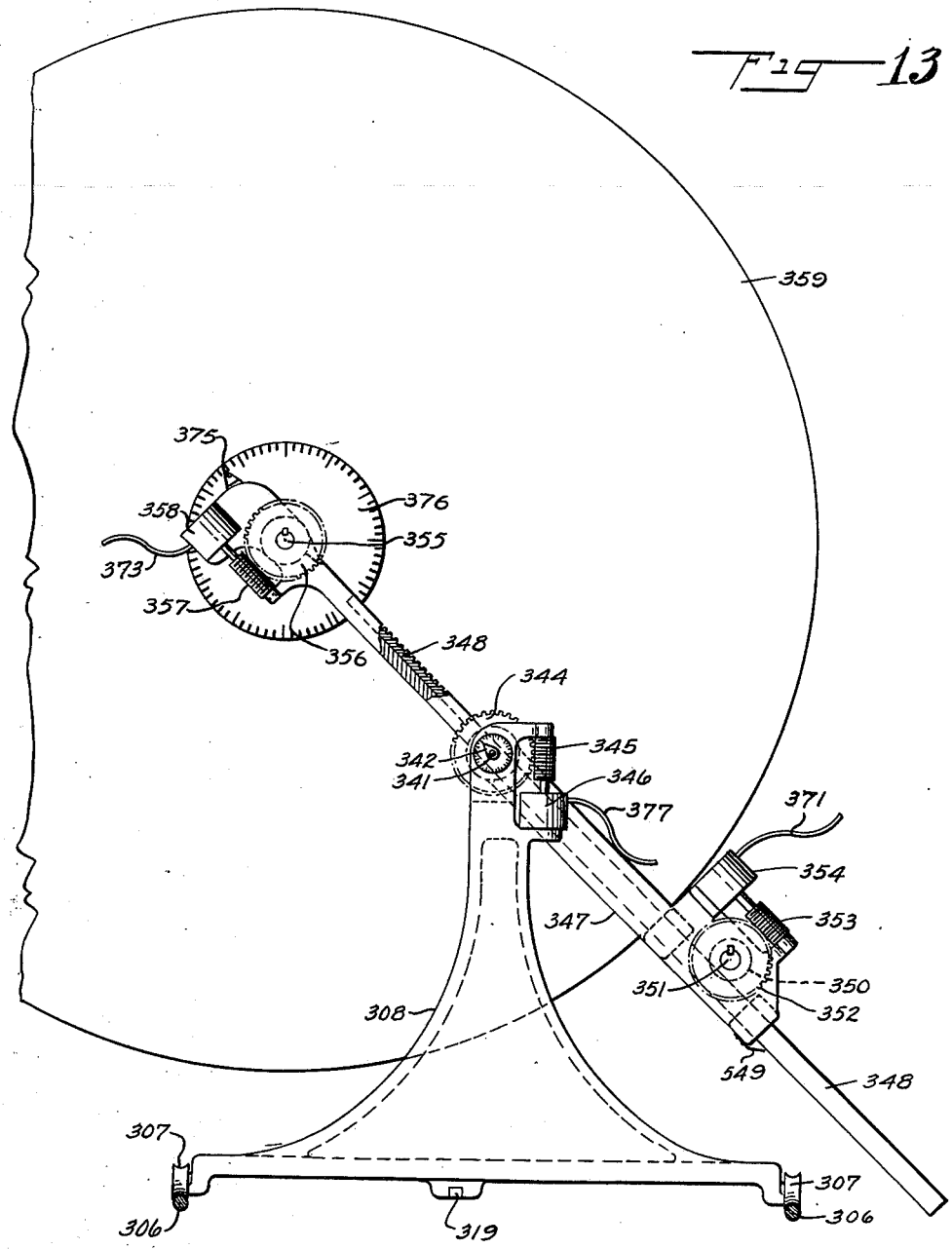
INVENTOR
John Hays Hammond, Jr.
BY
ATTORNEY

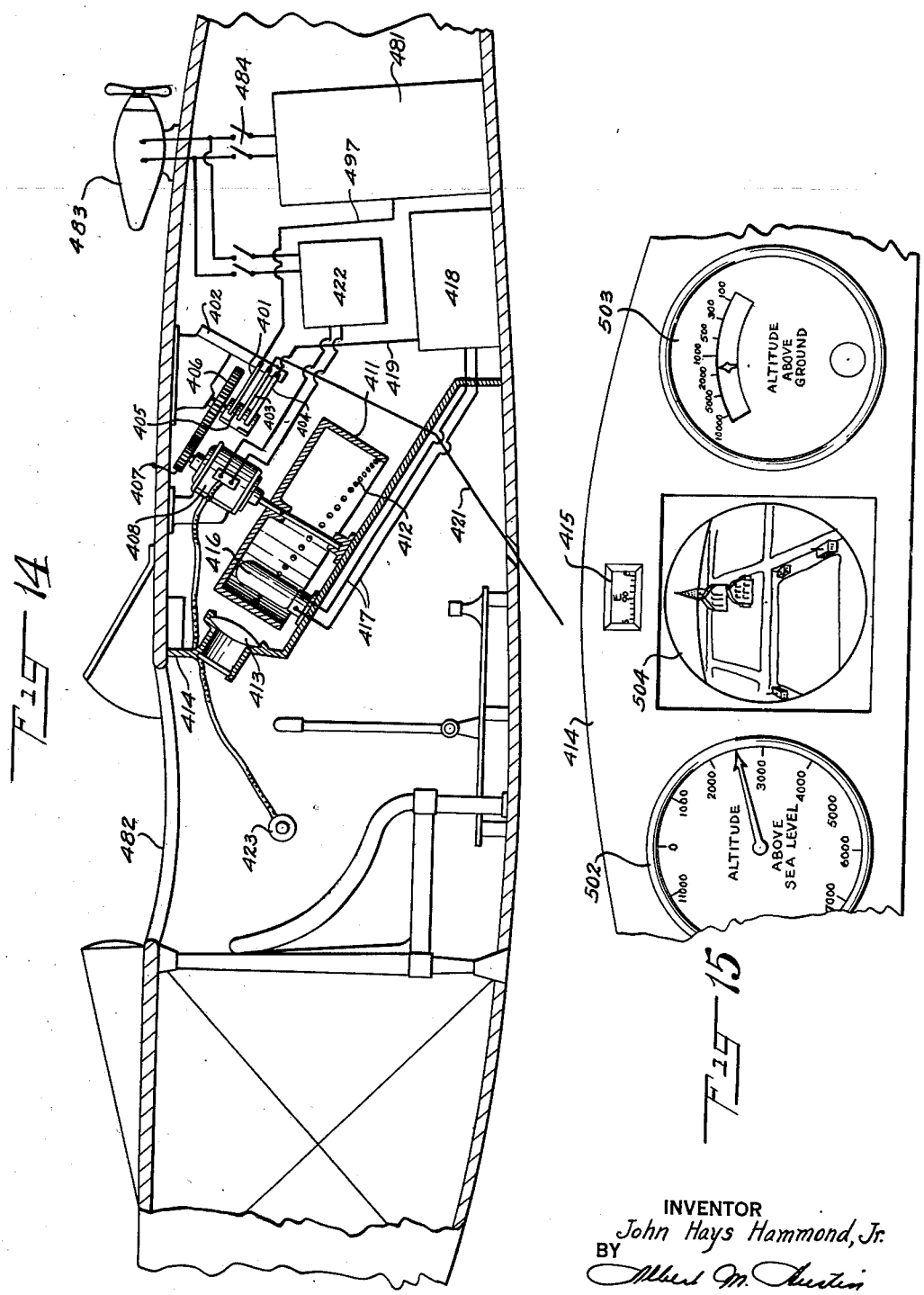

Patented Nov. 24, 1936

2,062,003

UNITED STATES PATENT OFFICE 2,062,003

NAVIGATIONAL GUIDE SYSTEM

John Hays Hammond, Jr., Gloucester, Mass.

Application November 2, 1929, Serial No. 404,282
Renewed September 26, 1935

14 Claims. (Cl. 250—11)

The invention relates to a navigational guide system, and more particularly to one of a plurality of systems for designating to a pilot his bearings with reference to a fixed location, certain others of these systems being described and claimed in the following copending applications: Serial No. 386,587, filed August 17, 1929, Serial No. 403,205, filed October 29, 1929, and Serial No. 403,206, filed October 29, 1929, all of said applications being entitled "Navigational guide system".

The invention as specifically applied to an aeronautical guide system provides means whereby the aircraft pilot may be informed of his position with reference to a landing field, and is particularly adaptable in cases where the visibility is poor. This system is advantageous in cases where the aircraft is flying at night or in foggy weather, or when the clouds intervene between the aircraft and the land.

The present invention provides a system whereby the pilot of an aircraft is visually notified of the objects along a predetermined line of travel of his craft. In this system signals emanating from an aircraft are impressed upon a plurality of direction finders located at various fixed positions such as on a landing field. These direction finders are oriented in order to effect a predetermined responsiveness. A plotting mechanism is provided which is actuated in response to the orientation of said direction finders and which designates the position of the aircraft upon a disk which corresponds to the terrane of the landing field.

A television pick-up system is provided which has associated therewith a map of the field with the various characteristics thereof indicated preferably in relief. An element is also provided corresponding to the airplane. A relative movement of said element with respect to the relief map is effected corresponding to the movement of the airplane with respect to the field. This reproduction of the airplane movement by said element is effected in response to the actuation of the plotting mechanism and suitable altitude indicating devices. The object on the relief map in the line of travel of the element in this system is then transmitted to the pilot of the aircraft by television.

Through the agency of the present invention the pilot can continuously observe the object on the field along his line of travel, obviating thereby a possible collision with said object. In this way the airplane and the pilot can effect a safe landing.

This invention has been described with reference to its application to an aircraft, but it is obvious that it can be applied equally as well to any other moving craft, such as a boat, submarine, etc.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 shows a birdseye view of a landing field and surrounding country;

Fig. 2 is a side elevation of one of the direction finders with its associated receiving system;

Fig. 3 is a front elevation of one of the direction finders;

Fig. 4 is a front elevation of the plotting mechanism;

Fig. 5 is a sectional view on the line 5—5 of Fig. 4;

Fig. 6 is a section taken on the line 6—6 of Fig. 5;

Fig. 7 is a detail view of the light source of the plotting mechanism indicated in Fig. 5;

Fig. 9 is a top plan view partly in section of the television pick-up system;

Fig. 10 is a perspective view showing details of the relief map associated with Fig. 9;

Fig. 11 is a side elevation of the television pick-up system;

Fig. 12 is a section taken on the line 12—12 of Fig. 11;

Fig. 13 is a front elevation of the television pick-up system;

Fig. 14 is a section taken through the aircraft showing details of the television receiving system; and Fig. 15 is a front elevation of the instrument board on the aircraft.

Like reference characters denote like parts in the several figures of the drawings.

Figure 8:
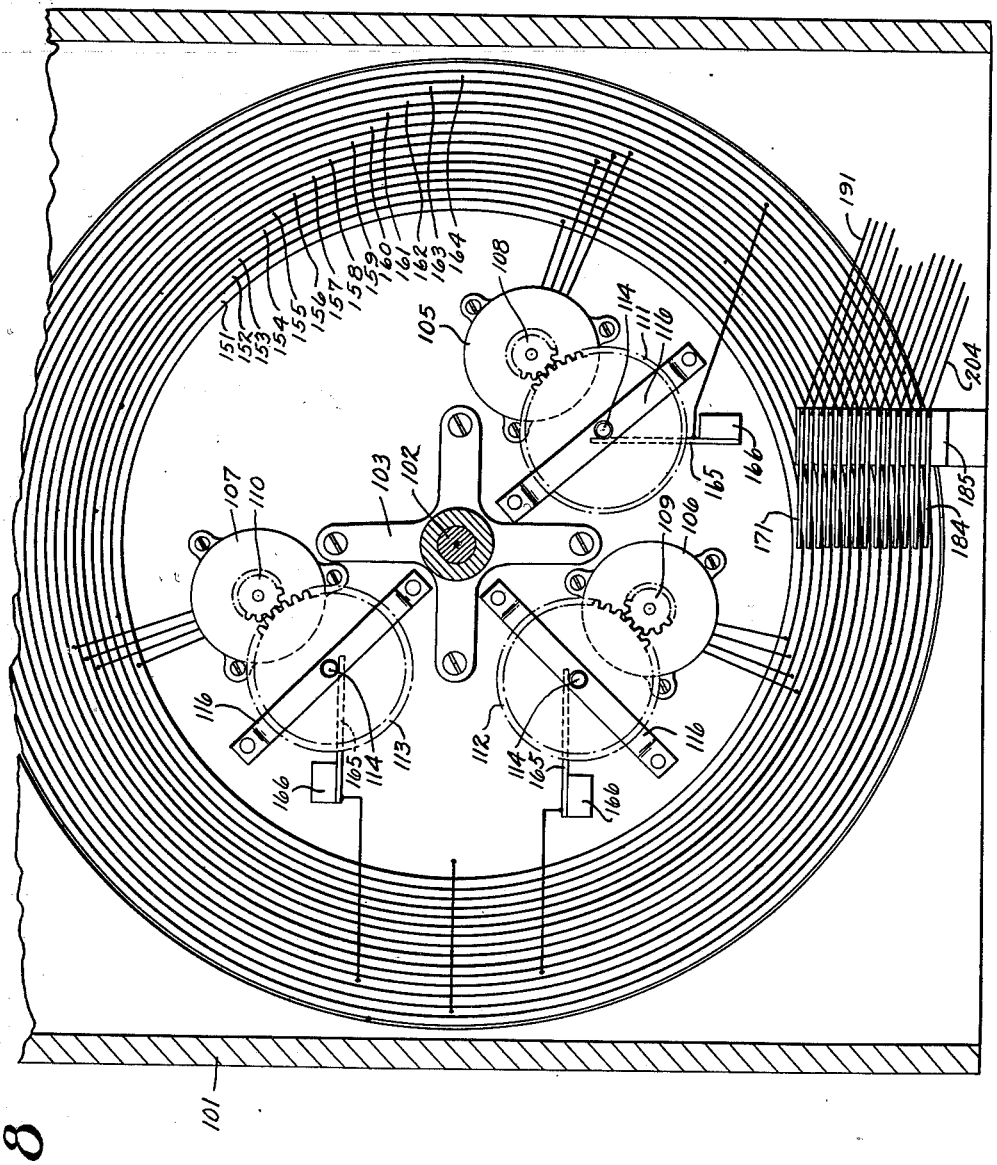
Fig. 8 is a section taken on the line 8—8 of Fig. 5.

In the following description and in the claims parts will be identified by specific names for convenience, but they are intended to be as generic in their application to similar parts as the art will permit.

In the adaptation of the invention to an aeronautical system shown in Fig. 1, the landing field is indicated at 20, and the three direction finder stations at 21, 22 and 23. The approaching airplane is shown at 24, and the television transmitting station at 25. Other objects of the landscape are shown, such as a hill 26, a forest 27, river 28, a church steeple 29, and two tall chimneys 31 and 32.

The projection of the airplane on the surface of the earth is indicated at a point 33. Joining this point with the three direction finder stations are three lines 34, 35 and 36, which form azimuth angles R. S. T. with lines drawn from the direction finder stations to the center of the field 37. From the plane, 3 lines, 40, 41 and 42 are drawn to the three finder stations. These lines form elevation angles A, B, and C with the lines 34, 35 and 36, respectively.

The airplane 24 transmits a wireless signal which is picked up by the direction finder shown in Fig. 2. This direction finder consists of a pick up device in the form of a coil 45, wound around a frame of insulating material 46, which is rigidly secured to a shaft 47. This shaft has bearings in a frame 48, which is pivotally mounted on a base 49. Secured to the shaft 47 is a worm wheel 51, which meshes with the worm 52, mounted on a shaft 53, which has bearings in the frame 48. To this shaft is fastened a handle 54, and a gear 55 which meshes with a second gear 56 carried by the shaft of an electrical transmitter 57, connected to an electrical cable 58.

Any suitable transmitter and its associated repeater may be used such as are fully described in Patent No. 1,431,140 issued October 3, 1922, and indicated in Figs. 18, 19, 20, 21 of said patent.

Secured to the base 49, is a worm wheel 61 meshing with the worm 62, mounted on a shaft 63, which has bearings in the frame 48. Secured to one end of the shaft 63 is a handle 64, and to the other end is a gear 65, which meshes with a second gear 66 mounted on the shaft of an electrical transmitter 67, which is connected to an electrical cable 68.

One form of direction finder has been herein described, but it is obvious that any other suitable form of direction finder can be applied equally as well to the present invention.

The coil 45 is connected by variable conductors 70 to the input circuit 71 of space discharge device 72. A balancing condenser 73 is provided with a pair of stationary plates 74 which are connected to the two terminals of coil 45 and with a movable plate 75 which is connected to ground. Output circuit 76 of space discharge device 72 may be connected through transformer 77 to the input circuit 78 of a second space discharge device, or amplifier 79 the output circuit of which is connected to head phone 81 or other indicating means. Battery 82 which is connected to the filament of space discharge device 72 is preferably enclosed in a shield 83 which is connected through a condenser 84 to ground.

In operation the balancing condenser 73 is adjusted, so that the coil 45 when properly balanced produces no response in the receiver 81 when the coil 45 is rotated into a plane normal to the direction of the received signals.

The above described pick-up circuit has been shown by way of illustration only, but it is to be understood that coil 45 may be connected to any suitable radio receiving circuit which is capable of receiving the radiant energy signals intercepted by said coil 45 and converting the same into a form suitable for actuating an indicating device.

In place of the radio pick-up device of the direction finders shown in Fig. 2 a system of sound direction finding may be used. This pick-up device may be of any suitable construction which is actuated in response to compressional waves. The system may be operated in the same manner as that described in connection with Fig. 2.

The plotting mechanism shown in Figs. 4 to 8 consists of a frame 101 in which is rotatably mounted a shaft 102. Pinned to the shaft 102 is a bracket 103 upon which is mounted a disc 104. Mounted on the disc 104 by means of four studs 233 is a disc 234 of glass or other suitable transparent material.

Secured to the disc 104 are three electrical repeaters 105, 106 and 107. These are similar to the type described in Patent No. 1,431,140 previously referred to. Secured to the shafts of these repeaters are three pinions 108, 109 and 110 which mesh with three gears 111, 112 and 113. These gears are mounted on shafts 114 (see Fig. 7) which are mounted in insulating bushings 115, carried by brackets 116. These shafts are also mounted on insulating bushings 117 in the plate 104. Secured to the end of the shaft 114 is a light casing 118, in which is mounted a small incandescent lamp 119. Pressing against the central terminal of this lamp is a spring 121, which is mounted on a piece of insulation 122, carried by the light casing 118. This spring is always in contact with the metallic plate 104. Mounted in the end of the casing 118 is a suitable set of lenses 123, which cause the light from the lamp 119 to be formed into a parallel beam. Covering the opening of the casing 118 is a cap 124, which is provided with a slot 125 for causing this beam to be projected on the plate 104, as a narrow ray of light.

The three repeaters 105, 106 and 107 control the rotation of the three light projectors, 127, 128 and 129, as seen in Fig. 4. The three beams of light emitted by the light projectors 127, 128 and 129 are shown in 131, 132 and 133 respectively. It will be noticed that the three light projectors are located in positions on the disc 104, which correspond to the positions of the direction finders 21, 22 and 23, with respect to the landing field 20.

On the back of the plate 104 are mounted 14 circular segments of conducting material 151 to 164, (see Fig. 7). The segment 151 is connected to the three common return wires of the repeaters 105, 106 and 107. The segments 152, 153 and 154 are connected to the other three wires of the repeater 106. The segments 155, 156 and 157 are connected to the other three wires of the repeater 107, and the segments 158, 159 and 160 are connected to the other three wires of the repeater 105. The segment 161 is connected to a contact brush 165, which is carried by a piece of insulation 166, mounted on the disc 104. This contact brush engages the shaft of the gear 112. The contact segment 162 is connected to a similar brush, engaging the shaft of the gear 113, and the contact segment 163 is connected to a third brush, engaging the shaft of the gear 111. The contact segment 164 is connected to the plate 104. Engaging the 14 contact segments 151 to 164 are 14 brushes, 171 to 184, which are connected to 14 conductors 191 to 204. The brushes 171 to 184 are mounted on a block of insulating material 185, which is mounted on the frame 101.

The frame 101 is provided with two brackets 235 and 236, in which are rotatably mounted threaded shaft 237 and square shaft 238. Mounted on these two shafts is a slider 239, which carries a designating member such as eye piece 241 (Fig. 6). This eye piece is provided with a suitable magnifying lens system, which may take the form of lens 242. This eye piece 241 is also provided with a set of cross hairs 243. Rotatably mounted with respect to the casing of the eye piece 241, is a worm wheel 244, which meshes with a worm 245, slidably mounted on the shaft 238. Secured to the worm wheel 244, is a cylindrical piece of insulating material 246, which carries two slip rings 247 and 248. On the lower portion of the insulation 246, is mounted a pair of semi-circular contact segments 251 and 252, which are electrically connected to the slip rings 247 and 248 respectively and which are separated by strips of insulation (not shown). Secured to the lower end of the eye piece 241, is the inner track of a ball bearing 253. To the outer track of the ball bearing is secured an arm 254, which carries a roller 255 having cooperative engagement with the two semi-circular segments 251 and 252. On the opposite side of the outer track of the ball bearing 253, is mounted a roller 256, the circumference of which may be made of soft rubber or other suitable material. This roller presses against the sheet of glass 234.

Engaging the two slip rings 247, and 248 are two brushes 257 and 258, which are carried by a block of insulation 259, secured to the slider 239. The contacts 257 and 258 are bent around this block, and engage two strips of conducting material 261 and 262, carried by a strip of insulating material 263. The contact strips 261 and 262, are connected by two conductors 264 and 265 (Fig. 5), to a reversing switch 266 which is connected through the battery 260 to the frame 101 and which controls the operation of a motor 267. This switch may be of any well known or standard construction, and is supplied from the conductors 268 and 269. Secured to the shaft of the motor 267 is a bevel gear 271, which meshes with a second bevel gear 272 secured to the shaft 238. The other end of this shaft carries a bevel gear 273 which meshes with another bevel gear 274, mounted on the shaft of an electrical transmitter 275.

The shaft 237, which is threaded through the slider 239, is provided at one end with a handle or crank 276, and at the other end with a bevel gear 277, which meshes with a second bevel gear 278. The latter is mounted on the shaft of an electrical transmitter 279.

Secured to the shaft 102, is a worm wheel 281 which meshes with a worm 282. This worm is mounted on a shaft 283, which has bearings in brackets 284 and 285. To one end of this shaft is secured a crank 286, and to the other end an electrical transmitter 287.

In the pickup system shown in Figs. 9 to 13 a base plate 301 is provided having four brackets 302 in which are mounted two rods 303. Resting on these rods are four grooved rollers 304 carried by the framework 305. This frame is provided with two rods 306 on which rest four other grooved rollers 307, these rollers being mounted in a frame 308. Rotatably mounted in the frame 305 is a shaft 311 to the lower end of which is secured a box cam 312 (see Fig. 12). This cam is provided with a spiral groove 313, in which slides a pin 314 secured to the base plate 301. To the shaft 311 is pinned a worm wheel 315 which meshes with a worm 316 carried on the shaft of an electrical repeater 317. Also pinned to the shaft 311, is a gear 318, which meshes with a rack 319 secured at one end to the frame 308.

Mounted on the base 301 through the agency of a bracket 321, is a lamp 322 which light is reflected from a curved mirror 323. Mounted on a bracket 324 secured to the base 301 is a motor 325. This motor is driven by any suitable source, and is kept running at a constant speed by any suitable means. To the shaft of this motor is fixed a disc 326 which is provided with a plurality of holes 327 arranged in the form of a spiral near the edge of this disc.

A photo electric cell 329 is mounted on a cylindrical casing 331 which encloses the motor 325. This photo electric cell 329 is connected to any suitable television transmission system 310. Mounted in the casing 331 is a lens 332 which is in line with the spiral holes 327 and the photo electric cell 329. Mounted on the frame 305 by means of a bracket 334 is a cylindrical casing 335 which is telescopically mounted with respect to the casing 331. This casing 335 has mounted thereon a lens 336, the axis of which is in the same line as the axis of the lens 332.

Rotatably mounted in the upper end of the frame 308 is a shaft 341, to which is secured a pointer 342, registering with a dial secured to the frame 308. Pinned to this shaft is a worm wheel 344, which meshes with a worm 345 carried on the shaft of an electrical repeater 346. To the other end of the shaft 341 is pinned a member 347 in which is slidably mounted a rack 348. A pointer 349 registers with a scale engraved on the side of this rack. Meshing with this rack is a pinion 350 which is secured to a shaft 351, having bearings in the member 347. Pinned to this shaft is a worm wheel 352 which meshes with a worm 353 carried on the shaft of an electrical repeater 354. Rotatably mounted in the upper end of the rack 348 is a shaft 355 which has secured at one end thereof a worm wheel 356. Meshing with this is a worm 357 which is mounted on the shaft of an electrical repeater 358. Secured to the other end of the shaft 355 is a disc 359 on the other side of which is mounted a relief model of the landing field and surrounding country, as shown in Fig. 10. The light 322 serves to illuminate this disc 359. Located in the corners of the landing field (see Figure 10) are four upright members 368, which may be made of any flexible material such as rubber or light springs. The height of these upright members 368 is such that the angle made by a line drawn from the top thereof to the opposite corner of the field will be about 15° or a suitable gliding angle for the plane. The axis 379 of the lens system 332, 336 is inclined at a suitable gliding angle such as 15° with the disc 359.

For transmitting the signals from the airplane, a radio signal transmitter 481 is provided in the airplane 482 (Fig. 14). This transmitter may be of any suitable and well known construction and is not herein described in detail therefore. This transmitter is supplied with current from a wind driven generator 483 through the switch 484. The output conductor 497 of this transmitter is connected to a brush 401 mounted on a strip of insulation 402 which is supported from the frame of the airplane. Also mounted on this strip of insulation are two brushes 403 and 404, which in conjunction with the brush 401 engage a commutator 405. This commutator is so constructed that the brushes 401 and 404 will be alternately connected with the brush 403, each being connected for a half revolution of the commutator. The commutator 405 is mounted on a gear 406, which meshes with a pinion 407, the ratio between the two being two to one. The pinion 407 is mounted on the shaft of a motor 408, which is supported from the frame of the airplane. On the shaft of this motor is mounted a drum 411, provided with a plurality of holes 412, arranged on a helix on the periphery of this drum. In front of the drum 411 is mounted a lens 413, in an opening in the instrument board 414. Mounted above this lens is a standard compass 415. Mounted inside of the drum 411 is a neon tube 416, which is connected by a cable 417 to a television receiver 418. This may be of any suitable and well known construction. The television receiver is connected by a conductor 419 to the brush 404 and the brush 403 is connected to a trailing antenna 421.

The motor 408 is supplied by current from the wind driven generator 483, this supply being controlled by a synchronizing means 422, and a control means 423, which is operated by the aviator, so as to synchronize the drum 411 with the transmitting apparatus on the ground.

The airplane is provided with an instrument board 414 which has mounted thereon a standard compass 415, an altimeter 502 for indicating the altitude of the plane above the sea level, and a meter 503 for indicating the altitude of the plane above the ground. Also mounted on this instrument board in front of the television receiving unit is a screen 504 upon which the image transmitted is projected.

The altimeter 503 may be of any suitable construction and may take the form of radio altimeter described in Science and Invention for February, 1929 pages 952–953. This type of altimeter operates in response to the reflection from the ground of radio waves propagated from the plane.

In the operation of this form of the invention when an airplane 24 approaches the landing field 20, signals will be sent from the transmitter 481 over the conductor 497, brush 401, commutator 405, brush 403, to the antenna 421. These signals will be sent intermittently due to the rotation of the commutator 405 and will be received by the three direction finder stations 21, 22 and 23. This reception is accomplished by the loop 45, which picks up the signals which are amplified by the tubes 72 and 79, and are then heard in the phones 81. The two systems of receptions which may be used are either the maximum or the minimum effect with the coil 45. It is found, however, that the minimum effect gives the most accurate results so that system will be described here, though the maximum effect may be used when found to be advantageous.

In the operation of the present invention the coil 45 is initially set so that its plane is vertical and so positioned that the projection on the field of the normal to this plane passing through the center of the coil also passes through the center of the landing field point 37 (Fig. 1). The other two direction finders are similarly oriented. The three light projectors 127, 128 and 129 in Fig. 4 are also adjusted so that the projection of the beams of light pass through the center of the field which is indicated by the point 37. The circuits from the three transmitters 67, of the three direction finders 21, 22, and 23 to the three repeaters 105, 106 and 107, are then closed. This is accomplished by closing switches which are not shown, connecting the four wires in each of the three cables 68 to the four wires respectively of each of the three repeaters 105, 106 and 107. At the same time switches are closed which are located adjacent to each direction finder 21, 22 and 23, and which turn on and off the light beams 131, 132 and 133, by closing or opening the circuits through the conductors 201, 202 and 203, brushes 183, 182 and 181, segments 163, 162 and 161 to the brushes 165, thence along shafts 114, casings 118, to lamps 119. The current returns through springs 121, plate 104, segment 164, brush 184, conductor 204, through a battery back to the switches located adjacent to the direction finders.

When an airplane 24 approaches the field 20 signals are transmitted from the airplane as already described, and are received by the three direction finders 21, 22 and 23. The signals received by these direction finders are heard in the head phones 81, and the operator orients the coil 45 by means of the handles 54 and 64, so that a minimum signal is received in the head phones 81. When this condition occurs the plane of the coil is normal to a line from the airplane to the center of the coil. The azimuth angles R. S. T. through which the three coils have been turned from their initial positions are transmitted by the electrical transmitters 67 to the three repeaters 105, 106 and 107, which cause the gears 111, 112 and 113 to be rotated through these angles, thereby turning the three light sources 127, 128 and 129, through the three angles R. S. T. as shown in Fig. 4. The point where the three light beams 131, 132 and 133 intersect on the disc 104 corresponds to the projection 33 of the airplane 24, on the surface of the earth. The handles 276 and 286 are then manipulated so as to move the slider 239 and turn the plate 104 to such positions that the cross hairs 243 will be over the intersection of the three light beams 131, 132 and 133. As the plane approaches the field and the angles R. S. T. vary, the handles 276 and 286 are manipulated so as to keep these cross hairs in registration with the intersections of the beams. The motion of the slider 239 is electrically transmitted by the transmitter 279 through cable 371, which includes a battery (not shown) to the repeater 354 which rotates the worm 353 thereby turning the worm wheel 352 and the pinion 350 a corresponding amount. This causes the rack 348 to be moved at the same speed as the slider 239, thereby maintaining the distance between the shafts 341 and 355 equal to the distance between the intersection of the cross hairs 243 and the center of the plate 104. The motion of rotation of the plate 104 is electrically transmitted by means of the transmitter 287 through a cable 373 which includes a battery (not shown) to the repeater 358 which, by means of the worm and wheel 357 and 356, causes the plate 359 to be rotated through the same angle that the plate 104 has been rotated through. This angle is indicated by a pointer 375 on a dial 376 which is located on back of the disc 359.

As the slider 239 and the disc 104 together with the glass plate 234 moves the roller 256 will take up a position due to the castering action of its construction, so that it will point in the opposite direction to the relative motion of the slider 239 with respect to the glass 234. As this roller 256 turns, the roller 255 which is in electrical contact with the frame 101 will engage either one or the other of the semi-circular contact segments 251 or 252, depending upon which way the roller 256 swings. As it does so it will close a circuit through either the slip ring 247, brush 257, contact strip 261, conductor 264, or through the slip ring 248, brush 258, contact strip 262, conductor 265, thus causing the reversing switch 266 to be operated, which in turn will start the motor 267 rotating in one direction or the other, depending upon which contact was engaged. This motor, through the beveled gears 271, 272 causes a rotation of the square shaft 238, which in turn rotates the worm 245, thus turning the wheel 244. This causes the rotation of the contact segments 251 and 252 until the insulation between them has moved under the roller 255, at which time the circuit through the reversing switch 266 is broken, thus stopping the motor 267. In this way the gear 244, together with the contact segments 251 and 252 with the slip rings 247 and 248 will follow up the motion of the arm 254 and the roller 256. The position which the roller 256 will assume as already described will be the line of travel of the airplane with respect to the glass plate 234. In other words the position of this roller will indicate the direction of travel of the airplane over the country surrounding the landing field. This direction is transmitted by means of the transmitter 275 over a cable 377 which includes a battery (not shown) to the repeater 346. This effects by means of the worm and wheel 345—344 the rotation of the member 347. This swings the rack 348 into a corresponding angle thus swinging the whole disc 359 about the axis of the shaft 341. In this way the projection of the axis 379 of the lens system 336—332 upon the disc 359 will always make the same angle with this disc as the roller 256 makes with the glass plate 234.

The altitude of the plane may be determined by measuring the angles A, B, C, which are transmitted by the transmitters 57 on the three direction finders 21, 22 and 23 to an airplane range finder system of any well known design, such as that described in United States Patent, 1,408,504. The angles R. S. T. already referred to are transmitted to this range finder. The altitude of the plane above the ground determined therefrom is transmitted to the repeater 317. This by means of the worm and wheel 316—315 turns the shaft 311 which rotates the gear 318 thus moving the rack 319. This causes the frame 308 to be rolled along the rods 306 so that the distance from lens 336 to the disc 359 will be the altitude of the plane on the scale of the model.

The scene picked up by the television apparatus will be that seen along this axis 379 and will correspond to what would be observed by the aviator were he approaching the field at an inclination of 15° with the ground. The lens 336 will be located in the same position with respect to the disc 359 that the airplane is located with respect to the landing field and disc 359.

As the disc 359 moves away from the lens 336, the distance from this lens to the disc along the axis 379 will be increased. This will necessitate shortening the distance between the lens 336 and the disc 326 so as to keep the image of the disc 359 focused on the disc 326. The focal length of the lens 336 is correspondingly adjusted through the agency of the box cam 312 which is rotated by the shaft 311. This shaft 311 rotates an amount proportional to the altitude of the plane as heretofore described. As this cam rotates, it will move the whole carriage 305 through the co-operative action of the pin 314 with the associated slot 313. This motion of the carriage 305 effects the movement of the cylindrical casing 335 together with the lens 336 to the right, as viewed in Fig. 9, thereby decreasing the distance from the lens 336 to the disc 326. By properly shaping the slot 313 the image of the disc 359 will always be maintained in focused relationship with the lens 336 on the disc 326.

The image on the disc 359 along the axis 379 will be scanned by the disc 326. The scanned light from the image will be impressed upon the photoelectric cell 329 and translated thereby into current undulations. These current pulsations are then transmitted to the television transmitter from which they are propagated as wireless signals. These wireless signals are then received by the antenna 421 in the airplane (Fig. 14). During half the revolution of the commutator 405 the signals are conducted to the brush 404, and thence by the conductor 419, to the television receiver 418, where they are amplified in a well known manner. The amplified signals are then impressed upon the neon tube 416 or other suitable variable source of illumination to control the light emitted therefrom. The light from the tube 416 passes through the holes 412 in the drum 411, as this drum is rotated by the motor 408, and forms an image of the map on the lens 413 as shown in Fig. 14. The speed of the motor 408 which is controlled by the synchronizing means 421 may be varied by turning the handle 423, so that the aviator can always correct for slight variations of the synchronizing means. The aviator therefore will always have in front of him a view of the landing field along his line of travel so that he can accordingly guide his plane safely towards this field.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is.

1. The steps in a method of informing the pilot of a craft his three dimensional position with reference to a fixed location which comprise, determining the position of the craft relative to the surrounding terrain from signals sent out from the craft, determining the position of the craft relative to a relief map representative of the surrounding terrain so that the determined position of the craft bears the same relation to the map as regards horizontal projection and elevation as the craft bears to the surrounding terrain, scanning the map surface from the determined position of the craft along the same predetermined line of sight as that along which the pilot would see the surrounding terrain and transmitting to the craft signals capable of being translated into a picture of the map surface corresponding to a panoramic view of the surrounding terrain as it would be seen by the pilot of the craft along the predetermined line of sight.

2. The steps in a method of continuously informing the pilot of a craft his three dimensional position with reference to a fixed location which comprise, continuously determining the position of the craft relative to the surrounding terrain from signals sent out from the craft, continuously determining the position of the craft relative to a relief map representative of the surrounding terrain so that the various determined positions of the craft trace a path which bears the same relation to the relief map as regards horizontal projection and elevation as the path traced by the craft bears to the surrounding terrain, continuously scanning the map surface from the determined positions of the craft along the same predetermined line of sight as that along which the pilot would see the surrounding terrain and continuously transmitting to the craft signals capable of being translated into a continuous picture of the map surface corresponding to a panoramic view of the surrounding terrain as it would be seen by the pilot of the craft along the predetermined line of sight.

3. In a navigational guide system, means including a plurality of direction finders for determining the position of a craft with respect to a fixed location, a relief map of the terrain adjacent said fixed location, an element corresponding to the craft including a television scanning device, means controlled by said direction finders for determining the horizontal projection and elevation of the craft with respect to the ground, means for displacing said element with respect to the map in accordance with said determinations so that in its displaced position it bears the same relation to the map as regards horizontal projection and elevation as the craft bears to the surrounding terrain, the scanning device being arranged so as to scan the map at an angle with respect to the surface of the map which is substantially that of the line of sight along which the pilot would see the surrounding terrain from the craft, a television transmitting system connected to the scanning device and means controlled thereby for transmitting to the craft by television an image of that part of the map encountered by the scanning device.

4. A system for designating to the pilot of an aircraft his position with reference to a fixed location comprising, an aircraft, means for propagating signals from said aircraft, signal receiving means including direction finders located at a distance from said craft and adapted to be actuated to determine the direction of the source of the signals propagated from the craft, a relief map of the scenery surrounding the fixed location, means responsive to the actuation of said direction finders for reproducing with respect to said map the course of said aircraft with respect to the fixed location, said means including a movable television scanner arranged to scan the relief map in a predetermined direction and from a position which bears the same relation with respect to the map as regards horizontal projection and elevation as the craft bears to the terrain and television transmission means connected with said television scanner for transmitting to the aircraft an image of that part of the relief map scanned by said television scanner, along substantially the same predetermined line of sight as that along which the pilot would see the corresponding part of the terrain.

5. A system for designating to the pilot of an aircraft his position with reference to a fixed location comprising, an aircraft, means for propagating radio signals from the aircraft, signal receiving means including direction finders located at a distance from the aircraft and adapted to be actuated to determine the direction of the source of the radio signals, a map of the scenery surrounding the fixed location, means responsive to the actuation of the direction finders for reproducing with respect to the map the relative course of the aircraft with respect to the fixed location, said means including a movable television scanning device arranged to bear the same relation with respect to the map as regards horizontal projection and elevation as the craft bears to the terrain, the scanning device being arranged so as to scan the map at an angle which is substantially that of the line of sight from the craft and television means connected with the scanner for transmitting to the aircraft an image of that part of the map along the same predetermined line as that along which the pilot would see the corresponding part of the terrain.

6. A system for facilitating the navigation of an aircraft towards a landing field, which comprises means for transmitting signals from the aircraft, a plurality of direction finders dispersed in the various parts of the landing field, means for orienting said direction finders to determine the direction of the signals emanating from the aircraft, plotting means responsive to the orientation of said direction finders for determining the azimuthal position of the aircraft with reference to the earth, altitude resolving means for determining the altitude of the aircraft above the ground, a relief map, a television scanning member disposed in the same relative position with respect to this map as the aircraft is disposed with respect to the field, means responsive to the conjoint actuation of said altitude resolving means and said plotting means for generating a relative course of said member with respect to the map corresponding to the relative course of the aircraft with respect to the landing field, television transmission means connected to the scanning member, said scanning member being arranged so as to scan the map at an angle substantially that of the line of sight from the craft whereby there is transmitted to the aircraft by television an image of that part of the map as would be seen along said line of sight.

7. In an aeronautical guide system the combination comprising a map of the characteristics of the scenery adjacent the landing field, a scanning member, a focusing member disposed with respect to said map in a position corresponding to the position of the aircraft with respect to the landing field and aligned with said scanning member along a predetermined direction, said focusing member being adapted to focus upon said scanning member those images of the map encountered along the said predetermined direction, means for moving said focusing member relatively with respect to the map whereby a course is generated by said member with respect to said map corresponding to the course generated by the aircraft with respect to the landing field, and means for transmitting to the aircraft by television an image of that part of the map corresponding to the object on the scenery which would be seen along the said predetermined direction from the craft.

8. In an aeronautical guide system the combination comprising a relief map of the characteristics of a landing field, a scanning member, a focusing member disposed with respect to said map in a position corresponding to the position of the aircraft with respect to the landing field and aligned with said scanning member along a predetermined direction, said focusing member being adapted to focus upon said scanning member those images of the map which would be seen along the said predetermined direction, means for moving said focusing member relatively with respect to the map whereby a course is generated by said member with respect to said map corresponding to the course generated by the aircraft with respect to the landing field, means for relatively displacing said scanning member and said focusing member along said predetermined direction so that the models on said map along said predetermined direction will be continuously focused on said scanning member, and means for transmitting to the aircraft by television the image of said models.

9. A system for informing the pilot of a craft from which signals are being propagated his position with reference to a fixed location, comprising a plurality of direction finders located adjacent said fixed location and including signal pick-up devices, means for orienting said pick-up devices from a fixed direction in accordance with the direction of the signals emitted from the said craft, whereby said devices will respond to said signals with predetermined characteristics, a rotatable disc, a plurality of light projecting members mounted on said disc and located to correspond to the position of the direction finders, means interconnecting said projecting members and said pick-up devices for rendering said projecting members rotatably responsive to the orientation of the pick-up devices whereby the rays emitted from said members meet at a point, an eye piece mounted for observation of said rays, means for effecting a relative parallel displacement of said eye piece and said disc so that the eye piece will be maintained in registration with the intersection of the light rays, altitude resolving means for determining the vertical position of said craft with respect to the fixed location, and means for reproducing on a miniature scale the generation of the course of the craft with respect to the fixed location in response to the conjoint actuation of said altitude resolving means, said eye piece and said discs.

10. In a plotting mechanism of the class described a rotatable disc, a designating member associated with the disc, a follower swivelly mounted with respect to the designating member and adapted to cooperate with the face of said disc, said follower being free to rotate as a whole with respect to the designating member, means for effecting a relative parallel displacement of said designating member and said disc whereby the follower will be disposed in a direction which is at right angles to the direction of relative displacement of the designating member and said disc, a motor and means for rotating the motor in accordance with the rotational movement of said follower with respect to the designating member.

11. A method of conveying to the pilot of a craft information for determining his three dimensional position with reference to a fixed location at a given moment which comprises determining at a fixed station the position of the craft with reference to the fixed location and its path of travel relative thereto, reproducing in miniature the movements of the craft relative to a map of the terrain surrounding the fixed location, transmitting to the craft a panoramic view at stated intervals of that portion of the map corresponding to the portion of the terrain as would be seen from the craft by the pilot if he could look in a predetermined direction from the craft at that moment, the intervals being chosen so as to take advantage of the phenomena of persistence of vision whereby the transmitted view takes the form of a continuous scene as it would be seen by the pilot of the craft in the predetermined direction.

12. In a three dimensional navigational guide system a plurality of direction finders for determining the position of a craft with respect to a fixed location, a plotting mechanism for plotting the position of the craft with respect to said fixed location in accordance with the determinations of said direction finders, a relief map of the scenery adjacent said fixed location, means including a movable scanning element positioned with respect to said map in the same relation as regards horizontal projection and elevation as the position of the craft with respect to said location, altitude resolving means for determining the altitude of the craft with respect to ground, means actuated in accordance with the conjoint actuation of said plotting mechanism and altitude resolving means for displacing said element with respect to the map whereby a course is generated by said element with respect to said map corresponding to the course generated by the craft with respect to the fixed location.

13. In a three dimensional navigational guide system, means including a plurality of direction finders for determining the position of a craft with respect to a fixed location, a relief map of the scenery adjacent said fixed location, an element corresponding to the craft including a television scanning device, means controlled by said direction finders for displacing said element with respect to the map so that its position bears the same three dimensional relationship to the map as the craft bears to the surrounding terrain whereby a course is generated by said element with respect to the map corresponding to the course generated by the craft with respect to the fixed location as determined by the first named means, said scanning device being arranged at a predetermined angle relative to the surface of the map assumed to be approximately that of the line of sight from the craft, a television transmission system connected to the scanning device and means controlled thereby, a television transmission system connected to the scanning device and means controlled thereby for transmitting to the craft signals corresponding to an image of that part of the map encountered along the same predetermined line from said element as that along with the pilot would see the surrounding terrain and means on the craft for intercepting said last named signals and translating them so as to produce the desired image.

14. In a television, facsimile or the like transmission system, scanning means including an optical system, supporting means for the subject to be scanned, supporting means for the scanning means, said supporting means being displaceable relative to one another, operable remote control means for displacing one of the supporting means with respect to the other thereof whereby the subject may be scanned from different positions as determined by the operation of the remote control means and means operable upon movement of one of the supporting means relative to the other thereof for maintaining in focus the optical system used in the scanning operation.

JOHN HAYS HAMMOND, Jr.